United States Patent Office 3,465,067
Patented Sept. 2, 1969

---

3,465,067
HIGH IMPACT POLYVINYL HALIDES
Jacques A. Waterman and Jan Selman, Amsterdam, Netherlands, assignors to Shell Oil Company, New York, N.Y., a corporation of Delaware
No Drawing. Filed Feb. 21, 1966, Ser. No. 528,820
Claims priority, application Netherlands, Feb. 23, 1965, 6502232
Int. Cl. C08f 29/22, 29/24
U.S. Cl. 260—890                              8 Claims

ABSTRACT OF THE DISCLOSURE

High impact polymers of vinyl halides are disclosed. These polymers comprise a mixture of polymers of a vinyl halide and a copolymer of a conjugated diolefin and an ester of a polybasic propylene carboxylic acid.

---

This invention relates to high impact polymers of vinyl halides or vinylidene halides. More particularly, the invention relates to high impact polymers comprising a mixture of polymers or copolymers of vinyl halides and/or vinylidene halides and a copolymer of a conjugated diolefin and an ester of a polybasic propylene carboxylic acid.

The polymers of the vinyl halides and vinylidene halides as well as copolymers of these materials make up a group of widely used resins. These resins are durable, weather and solvent resistant and have other desirable qualities which make them suitable for a variety of applications. Generally, however, these polymers are brittle and thus must be modified such as by the use of plasticizers therewith in order to produce useful products where impact resistance and flexibility are necessary or desired. While a number of known plasticizers impart flexibility to the polymer, the product does not have the desired impact strength desired. It is known that certain polymers and copolymers of conjugated diolefins impart impact resistance to polyvinyl chloride. For example, U.S. Patent 2,619,477 discloses the use of copolymers of butadiene and dimethyl itaconate wherein the latter is present in 65 to 90 parts by weight as a plasticizer for polyvinyl chloride while U.S. patent 2,779,748 discloses that a copolymer of butadiene and dialkyl fumarate lends high impact properties to polyvinyl chloride. However, for polymer applications where a very high impact resistance is necessary such as, for example, in preparing molded plastics and the like, these prior art compositions are not suitable.

It has been found according to the invention that compositions comprising a major amount of a polyvinyl halide or polyvinylidene halide or copolymers thereof with a minor amount of a copolymer or terpolymer containing at least 45% of a conjugated diolefin and at most 55% of an ester of polybasic propylene carboxylic acid, have greatly improved impact resistance over similar compositions known heretofore.

The major polymer in the compositions of the invention is a vinyl halide polymer or a vinylidene halide polymer or a copolymer of a vinyl halide and a vinylidene halide. Thus, suitable polymers include polyvinyl chloride, polyvinyl fluoride, polyvinylidene chloride, polyvinylidene fluoride, etc. Especially preferred is polyvinyl chloride.

The copolymers used in the compositions are those consisting of at least 45% by weight of a conjugated diolefin and at most 55% by weight of esters of polybasic propylene carboxylic acids of which at least one carboxyl group is attached to a saturated carbon atom and at least one carboxyl group is attached to an unsaturated carbon atom of the propylene moiety. The preferred copolymers are those having an ester content between 10 and 50% and more preferably between 15 and 40% by weight.

Diolefins used in the copolymer are preferably those conjugated diolefins of from 4 to about 8 carbon atoms and may be substituted with a halogen atom or cyano group. Suitable monomers include butadiene-1,3, isoprene, piperylene, dimethylbutadiene-1,3, chloroprene and the like. Butadiene-1,3 is preferred.

The polybasic propylene carboxylic acid esters are those in which one or more of the carboxyl groups have been esterfied. The remaining carboxyl groups may be esterified or free acid groups or the metal salts thereof such as an alkali metal carboxylate. Suitable ester groups may be alkyl, cycloalkyl or aromatic. However, preferred are alkyl ester groups of from one to five carbon atoms and where more than one ester group is present they may be the same or different. The polybasic propylene carboxylates may also be substituted on one or more of the carbon atoms of the acid portion of the molecule with alkyl groups having from one to five carbon atoms. Preferred esters are those of propylene di- and tricarboxylic acids such as aconitic acid, itaconic acid, glutaconic acid and isaconitic acid. The preferred esters are the full methyl or ethyl esters of these acids.

Terpolymers which may be used are those containing at least 45% by weight of conjugated diene, ester and a third copolymerizable monomer for example a vinyl aromatic such as styrene, alpha-methylstyrene, vinyl naphthalene, vinyltoluene, 1,1-diphenylethylene, etc. Such comonomers may be used in applications where transparent compositions and products are desired thereby taking advantage of differences in refractive indexes of the monomers.

The amount of the diene-ester copolymer or terpolymer used in the compositions of the invention is preferably between about 3 and 40% by weight based on the halogen-containing polymer and more preferably between about 5 and 15% by weight.

The diene-ester copolymers or terpolymers used may be prepared by any suitable method such as, for example, by emulsion or solution polymerization in the presence of free radical initiators, organometallic catalyst compositions such as alkali metal containing compositions and the like as are known to those skilled in the art. It has been found according to one embodiment of the invention that it is particularly desirable to use diene-ester copolymers or terpolymers as defined herein which possess molecular weights corresponding to certain Hoekstra plasticity values. Thus, it has been found that improved polymer compositions are prepared when diene-ester copolymers are used having a Hoekstra plasticity value between about 5 and 50 as determined by the method set forth in Rubber and Plastics Age, 42, 1079 (1961) at a loading time of 30 seconds.

The vinyl halide or vinylidene halide polymers are those which may be prepared by any convenient method such as by emulsion or suspension polymerization techniques as are well known to those skilled in the art.

The methods by which the vinyl halide and/or vinylidene halide polymers are mixed with the diene-ester copolymers is not critical. For example, the respective polymer latices prepared by emulsion polymerization techniques may be mixed together in the desired ratio and thereafter coagulated and further treated or a polymer dispersion prepared by suspension polymerization may be mixed and coagulated with a latex prepared by emulsion polymerization. Where the respective polymers are in the form of dry solids, mixing is usually performed at elevated temperatures by a suitable mixing device such as a rolling mill or the like. In a preferred method, a portion of the vinyl halide or vinylidene halide polymer is first thoroughly mixed with the diene-ester copolymer at relatively low temperature followed by blending in the remainder of the former polymer at a higher temperature.

Prior to mixing of the polymer components, it is desirable to add stabilizers to the respective polymer compositions.

In order to illustrate the preparation of the compositions of the invention and the properties thereof the following examples are provided. Unless otherwise stated, parts and percents are given by weight. The diene-ester copolymers were prepared by emulsion polymerization at 5° C. The polymerization mixture consisted of the following components with parts expressed per 100 parts by weight of the combined monomer weight.

| | Parts |
|---|---|
| Butadiene+ester | 100 |
| p-Methane hydroperoxide (catalyst) (pure peroxide) | 0.12 |
| Tert-dodecyl mercaptan | 0.10–0.40 |
| Emulsifier solution consisting of: | |
|   Water | 190 |
|   80% alkali metal rosin acid soap (Dresinate 515—Hercules Powder Co.) | 4.7 |
|   $Na_3PO_4.12H_2O$ | 0.70 |
|   Sodium alkaryl sulfonate (Tamol N-Rhom and Haas) | 0.02 |
|   Disodium salt of ethylene diaminetetraacetic acid | 0.01 |
| Activation solution consisting of: | |
|   $FeSO_4.7H_2O$ | 0.04 |
|   Disodium salt of ethylene-diaminetetraacetic acid | 0.05 |
|   Sodium formaldehyde sulfoxylate $.2H_2O$ | 0.10 |
|   Water | 10 |

The amount of mercaptan used was varied between the limits as set forth above to obtain copolymers of the desired Hoekstra plasticity values. The polymerization times varied between 7 and 24 hours with conversions between 22 and 93%. In addition, except where aconitate was the ester used, a quantity of benzene equal to the amount of ester present was also added to the mixture.

The polymerization reaction was terminated by the addition of 0.15 part of a 10% aqueous solution of the sodium salt of dimethyl dithio-carbamate. The unconverted monomers and benzene were then removed from the mixture by steam treatment and the latices were coagulated with ethanol at room temperature. The copolymers were then recovered, washed and dried for 10 hours at 70° C. after which 0.5% of 1,3,5-trimethyl-2,4,6-tri (3,5-ditert-butyl-4-hydroxyphenyl) benzene stabilizer was added. The copolymers were then mixed with an emulsion polymerized polyvinyl chloride polymer having an intrinsic viscosity determined in cyclohexene at 25° C. of 70 and to which had been added 2% of a mercapto-tin stabilizer. The polymers were mixed by milling about ⅓ of the polyvinyl chloride to be used with the copolymer at 100° C. for 5 minutes followed by milling the remainder of the polyvinyl chloride at 180° C. for 5 minutes. From the polymer mixture were prepared 8 mm. thick plates for determining Izod impact resistance and 1 mm. thick sheets for measuring yield stress.

Example I

Polymer mixtures of polyvinyl chloride and butadiene-dimethyl itaconate copolymers were prepared. The copolymers had different ratios of monomers as set forth in Table I below. All copolymers had a Hoekstra plasticity value of about 30. The polymer mixtures consisted of 10% copolymer based on the amount of polyvinyl chloride present.

TABLE I

| Weight ratio butadiene/ dimethyl itaconate in copolymer | Yield stress at 20° C., kg./cm.² | Izod impact resistance | |
|---|---|---|---|
| | | At 20° C., kg. cm./cm.² | At 0° C., kg. cm./cm.² |
| 80/20 | 455 | 70 | 31 |
| 70/30 | 450 | 60 | 29 |
| 60/40 | 455 | 53 | 28 |
| 50/50 | 470 | 29 | 10 |
| 40/60 | 445 | 16 | 8 |
| 30/70 | 470 | 8 | 6 |
| No copolymer added | 565 | 12 | 7 |

Example II

Polymer mixtures of polyvinyl chloride and butadiene-dimethyl itaconate copolymers were prepared wherein the copolymers had various Hoekstra plasticity values. In each mixture the quantity of copolymer added was 10% by weight of the polyvinyl chloride.

TABLE II

| | Weight ratio butadiene/dimethyl itaconate in copolymer | Hoekstra plasticity value | Yield stress at 20° C., kg./cm.² | Izod impact resistance | |
|---|---|---|---|---|---|
| | | | | At 20° C., kg. cm./cm.² | At 0° C., kg. cm./cm.² |
| (a) | 80/20 | 27 | 455 | 70 | 31 |
| | 80/20 | 40 | 440 | 60 | 26 |
| | 80/20 | 85 | 430 | 35 | 20 |
| (b) | 70/30 | 48 | 440 | 55 | 28 |
| | 70/30 | 58 | 445 | 35 | 23 |
| (c) | 60/40 | 33 | 445 | 53 | 28 |
| | 60/40 | 50 | 440 | 43 | 20 |
| (d) | 50/50 | 26 | 470 | 29 | 10 |
| | 50/50 | 40 | 445 | 20 | 8 |

Example III

In order to show a comparison of the improved properties of polymer blends according to this invention over similar compositions wherein a different ester monomer is used butadiene-ester copolymers were prepared according to the method set forth above using esters as set forth in Table III.

TABLE III

| | Ester used | Weight ratio Butadiene/ ester in copolymer | Hoekstra plasticity value | Yield stress at 20° C., kg./cm.² | Impact izod resistance at 20° C., kg. cm./cm.² |
|---|---|---|---|---|---|
| (a) | Dimethyl itaconate | 80/20 | 40 | 440 | 60 |
| | Dimethyl fumarate | 80/20 | 40 | 430 | 40 |
| (b) | Dimethyl itaconate | 70/30 | 48 | 440 | 55 |
| | Dimethyl fumarate | 70/30 | 48 | 440 | 30 |
| (c) | Dimethyl itaconate | 60/40 | 50 | 440 | 43 |
| | Dimethyl fumarate | 60/40 | 50 | 445 | 25 |

Example IV

Polymer mixtures were prepared containing polyvinyl chloride and butadiene-dimethyl itaconate copolymer. The polymer characteristics and properties were as set forth in Table IV.

TABLE IV

| | Weight ratio Butadiene/ dimethyl intaconate in copolymer | Hoekstra plasticity value | Quantity of copolymer, percent w., added, calc. on polyvinyl chloride | Yield stress at 20° C., kg./cm.² | Izod impact resistance At 29° C., kg. cm./cm.² | At 0° C., kg. cm./cm.² |
|---|---|---|---|---|---|---|
| (a) | 80/20 | 85 | 5 | 510 | 19 | 11 |
|  | 80/20 | 85 | 10 | 430 | 35 | 20 |
|  | 80/20 | 85 | 15 | 403 | 15 | 12 |
| (b) | 70/30 | 58 | 5 | 502 | 25 | 16 |
|  | 70/30 | 58 | 10 | 445 | 35 | 23 |
|  | 70/30 | 58 | 15 | 400 | 24 | 16 |
| (c) | 60/40 | 33 | 5 | 508 | 15 | 10 |
|  | 60/40 | 33 | 10 | 445 | 53 | 28 |
|  | 60/40 | 33 | 15 | 400 | 105 | ---------- |
| (d) | 60/40 | 50 | 5 | 515 | 17 | 11 |
|  | 60/40 | 50 | 10 | 440 | 43 | 29 |
|  | 60/40 | 50 | 15 | 410 | 105 | ---------- |
| (e) | 50/50 | 40 | 5 | 504 | 12 | 9 |
|  | 50/50 | 40 | 10 | 445 | 20 | 11 |
|  | 50/50 | 40 | 15 | 390 | 85 | ---------- |
| (f) | 50/50 | 26 | 5 | 520 | 12 | 8 |
|  | 50/50 | 26 | 10 | 470 | 29 | 10 |
|  | 50/50 | 26 | 15 | 420 | 70 | 19 |

Example V

A polymer composition was prepared containing 10% based on the polyvinyl chloride of butadiene/triethyl aconitate copolymer. The polymer characteristics and properties were as set forth in Table V.

TABLE V

| Weight ratio butadiene/ triethyl aconitate in copolymer | Hoekstra plasticity value | Yield stress at 20° C., kg./cm.² | Izod impact resistance At 20° C., kg. cm./cm.² | At 0° C., kg. cm./cm.² |
|---|---|---|---|---|
| 70/30 | 24 | 455 | 60 | 30 |
| 60/40 | 8 | 470 | 36 | 9 |

We claim as our invention:

1. A polymer composition comprising a major amount of a halide-containing polymer selected from the group consisting of a polyvinyl halide, a polyvinylidene halide and a copolymer of a vinylhalide and a vinylidene halide, and a minor amount of a copolymer of at least 45% by weight of a conjugated diolefin and an alkyl ester having from 1 to 5 carbon atoms of a polybasic propylene carboxylic acid having at least one carboxyl group attached to an unsaturated carbon atom and at least one carboxyl group attached to a saturated carbon atom.

2. A composition according to claim 1 wherein the amount of a alkyl ester present in the copolymer is between about 15 and 40% by weight.

3. A composition according to claim 1 wherein the amount of said diene copolymer is between about 3 and 40% by weight based on the halide containing polymer.

4. A composition according to claim 1 wherein the alkyl ester is an alkyl polyester of an acid selected from the group consisting of propylene dicarboxylic acid and propylene tricarboxylic acid.

5. A composition according to claim 1 wherein the acid is selected from the group consisting of aconitic acid, itaconic acid, glutaconic acid and isaconitic acid.

6. A composition according to claim 1 wherein the conjugated diolefin is butadiene.

7. A composition according to claim 1 wherein the alkyl ester is dimethyl itaconate.

8. A composition according to claim 1 wherein the diene copolymer has a Hoekstra plasticity value of between 5 and 50.

References Cited

UNITED STATES PATENTS

| 2,619,477 | 11/1952 | Banes et al. | 260—175 |
| 2,779,748 | 1/1957 | Snyder | 260—890 |
| 2,719,137 | 9/1955 | Tawney et al. | 260—890 |
| 3,230,186 | 1/1966 | Kreibich et al. | 260—878 |

SAMUEL H. BLECH, Primary Examiner

M. J. TULLY, Assistant Examiner

U.S. Cl. X.R.

260–78.5